Nov. 26, 1929. R. R. REILLY Re. 17,503

DIED-OUT BLANK FOR RECEPTACLES

Original Filed July 30, 1924

INVENTOR
R. R. Reilly
BY
John O. Seifert
ATTORNEY

Reissued Nov. 26, 1929 Re. 17,503

UNITED STATES PATENT OFFICE

RODOLPHE R. REILLY, OF ROSLYN, NEW YORK, ASSIGNOR, BY MESNE ASSIGNMENTS, TO SEALED CONTAINERS CORPORATION, OF NEW YORK, N. Y., A CORPORATION OF DELAWARE

DIED-OUT BLANK FOR RECEPTACLES

Original No. 1,623,269, dated April 5, 1927, Serial No. 729,034, filed July 30, 1924. Application for reissue filed April 4, 1929. Serial No. 352,590.

This invention relates to died-out blanks for making receptacle bodies, and it is the object of the invention to provide a died-out blank for making bodies of receptacles of truncated cone shape.

In making receptacles of truncated cone shape of this character a permanent closure in the form of a flanged disk is secured in the larger end of the receptacle and to close and seal the receptacle the open or smaller end is collapsed by squeezing or pinching the opposite wall portions together and securing said end in its collapsed condition by a member, usually of pliable metal, of inverted V-shape engaged over the collapsed end and pressing opposite portions of said member together with the collapsed end of the receptacle interposed and secured in such position by upset portions of the material of said sealing member. The function of the securing member is also to seal the receptacle by retaining the collapsed end of the receptacle in collapsed condition. However, due to inequalities in the top edge developed in the making of the receptacle it was found that said securing and sealing member did not properly seat upon the closed end of the receptacle with the result that the contents of the receptacle would be partially opened to the atmosphere and a consequent deterioration of the contents of the receptacle as well as leakage thereof.

It is the object of the present invention to overcome the above disadvantages by so constructing and arranging the blank from which the receptacle body is formed so that when the open end of the receptacle is collapsed the edges of the collapsed sides at said end of the receptacle will at all times be in a uniform plane substantially parallel with the base or bottom of the receptacle whereby the securing and sealing member may be properly seated thereon and retain the collapsed walls in contiguous and tight relation.

In the drawing accompanying and forming a part of this specification, Figure 1 is a plan view of my improved died-out blank.

Similar characters of reference designate like parts throughout the different views of the drawing.

Figure 1:
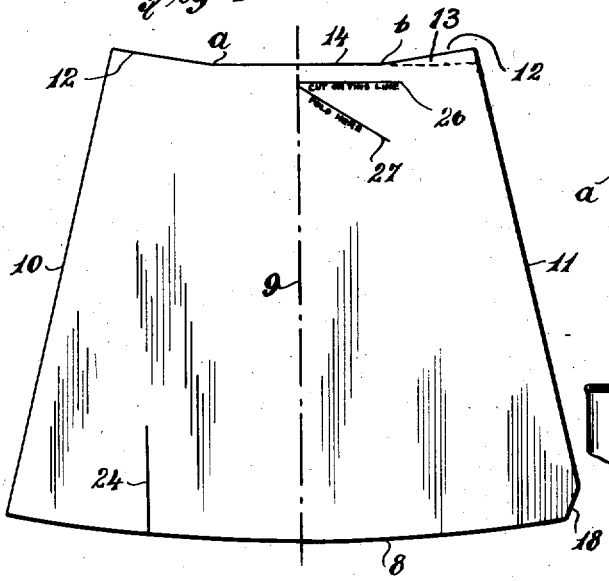

In carrying out the invention a suitable die is provided to cut out from a sheet or web a blank substantially of quadrilateral form, as shown in Figure 1, having an end, to constitute the base of the receptacle or container, of arcuate or curved form, as at 8, the same being in the arc of a circle whose center lies in a line extending vertically to said end and substantially centrally between the termini of said end, as represented at 9.

The opposite sides 10, 11, converge from the base to the top end of the sheet the inclination of said sides being at the same angle. The edge of the blank opposite to the arcuate shaped end is a chord of an angle intercepted by the sides of the angle formed by the edges 10, 11, which angle has its vertex at the center from which the arc of the base 8 is struck, said end having three straight line portions, an intermediate portion 14 and opposite end portions 12 inclined at an acute angle to the horizontal, as indicated by the dash line 13, and at an obtuse angle to and merging with the intermediate portion 14, as at *a* and *b*. The portions 12 and 14 are arranged and dimensioned so that when the upper open end of the receptacle formed from the blank is collapsed, said portions, constituting the upper edge of the receptacle, will be in an even plane, that is, extend in a straight line, and in the form of the receptacle body with the opposite edges 10, 11 in abutting relation the intermediate portion 14 is of an extent at least equal to both inclined portions 12, and said portion 14 is of a length less than the combined length of both the inclined portions 12 when the marginal portions of the opposite sides 10, 11 are overlapped, as illustrated, in securing the blank to form the receptacle body. To form the receptacle or container the sheet is wrapped or rolled about a horn or mandrel with the side edges in contiguous relation, preferably overlapped, so that the one side edge portion, such as the side 11, will overlap the side edge portion 10 to an extent represented by the dash line in Figure 4. By the sheet so formed a receptacle body of truncated cone shape is produced, as shown in Figures 2 and 3, the sheet being retained in rolled condition by a securing member, such as an adhesive strip 15 engaged over the edges 10, 11.

A closure is secured in the larger end to constitute the bottom, which closure consists of a flanged disk 16 (Figure 6) inserted into the end with the flange extending outward with the outer edge in parallel relation to the edge of the receptacle and secured therein by rolling the end portion of the receptacle and flange of the closure disk inwardly, as shown at 17. To facilitate this rolling of the sheet and disk flange together the corner of the sheet at the juncture of the base 8 with the side 11 is cut away on an angular line, as at 18, this cutaway portion commencing approximately at a height equal to the length of the flange of the closure disk 16 and extending laterally of the edge 11 to an extent substantially equal to the lap of said edge portion in relation to the edge portion 10.

Figure 4:
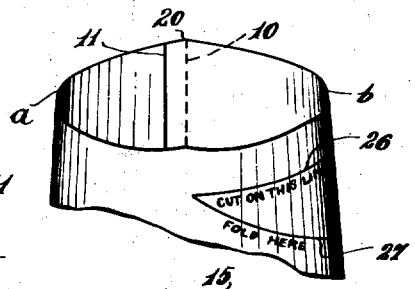
Figure 4 is a view in perspective of the upper portion and open end of a receptacle constructed from the blank shown in Figure 1.
Figure 5:
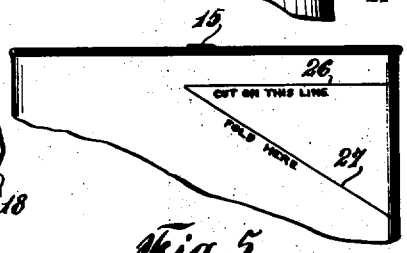
Figure 5 is a perspective view of the upper portion and open end of the receptacle showing the same in collapsed condition in order to close the same.
Figure 2:
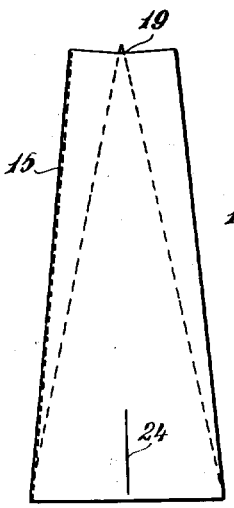
Figure 2 is a side elevation of a receptacle or container constructed from the blank shown in Figure 1 and showing in dotted lines the position the receptacle wall assumes when collapsed.

From a sheet of the form as described a receptacle body is produced in which the bottom or base is in a substantially horizontal plane while the upper edge when viewed from one side, as in Figure 2, will incline downwardly from opposite sides and merge substantially centrally of the receptacle, as at 19. When viewing the receptacle from the side in another position, as from the left of Figure 2, the top edge will incline upwardly from opposite sides and merge substantially centrally of the receptacle, as at 20. In effect, as shown in Figure 4, the opposite edge portions will incline upwardly from the points *a*, *b* representative of where the inclined portions 12 of the top of the sheet merge with the intermediate portion 14, and merge substantially centrally of the receptacle.

Figure 3:
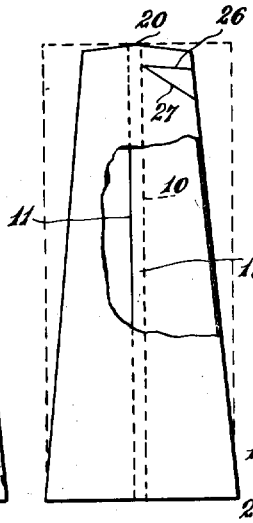
Figure 3 is a view looking at the left of Figure 2, partly broken away to show the arrangement of securing the sheet at the longitudinal edges, and showing in dotted lines the position the receptacle wall assumes when collapsed.
Figure 6:
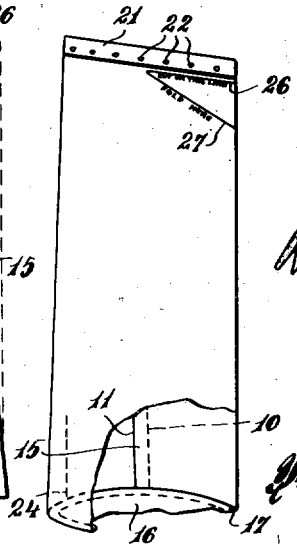
Figure 6 is a perspective view of a receptacle constructed from the blank shown in Figure 1 showing the open end collapsed and a closing and sealing member applied thereto, a portion of the lower end being broken away to show the manner of securing a closure or bottom in the end of the receptacle.
Figure 7:
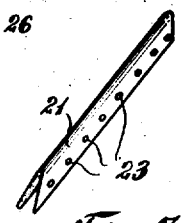
Figure 7 is a perspective view of the sealing member.

To close the receptacle so formed, as shown in Figures 2, 3 and 6, the upper and open end is collapsed; that is, the opposite wall portions are squeezed or pinched together, the wall portion with the overlapped edge and the opposite wall portion being moved relative to each other, as shown in dotted lines in Figures 2 and 3, and as viewed in Figure 2 the central portion 19 of the upper edge will be moved upward longitudinally of the receptacle while the opposite side portions will move downwardly, thus causing the meeting edges of the opposite wall portions to extend in a substantially uniform plane and parallel with the bottom or base of the receptacle, and in such condition a sealing member 21 (Figure 7) of pliable sheet metal is engaged over the top and will seat against the top edges, and as the opposite portions of said member are pinched together press the opposite wall portions of the receptacle firmly together, the sealing member being retained in position upon the receptacle by upsetting portions of the metal of said member, as at 22, and forcing said upset portions through the material of the receptacle and into perforations 23 in the opposite portion of the sealing member.

When the open end of the receptacle is collapsed as viewed in Figure 3 the central portion will be moved slightly downward longitudinally of the receptacle while the lateral portions are moved upward and the upper portion of the receptacle spread, as shown in dotted lines in said figure, thereby positioning the upper edge of the receptacle in a substantially uniform plane.

Receptacles of this character are used as milk containers to which the milk is supplied by filling machines and from which machines they are transferred to a conveyer to be presented to means to collapse the open ends and apply the sealing member 21 thereto. To properly position the receptacle upon the conveyer so that they will be presented in correct position to the seal applying means the sheet is arranged with an index in the form of a vertical line 24 positioned in predetermined relation to the side 10 of the sheet so that when the receptacle is formed from said sheet said index will be substantially axially of the receptacle, as shown in Figure 2.

The sheet, furthermore, is arranged with a horizontal line 26 adjacent the top, which line is arranged just below the edge of the sealing member 21 when the receptacle is filled and sealed, as indicated in Figure 6, and there is arranged adjacent said line the phrase "Cut on this line" to indicate that in order to remove the contents of the receptacle the top portion of the receptacle should be severed or cut on the line 26. The sheet is also arranged with an index line 27 extending downward at an angle to and from the line 26 with the words "Fold here" printed adjacent to said line, which is to indicate that the receptacle is to be folded on said line to close the receptacle after the receptacle has been opened by removing the sealing member and a portion of the contents only has been used.

Having thus described my invention I claim:

1. As an article of manufacture, a receptacle blank of quadrilateral form having one end of arcuate shape the center of the curve of which lies in a line extending vertical to said end, with the opposite sides of the blank converging from said arcuate shaped end, and the opposite end of the blank having an intermediate portion and opposite end portions extending outward from and at an obtuse angle to said intermediate portion and terminating at the sides, said intermediate portion being equal to one side of the receptacle at the upper end.

2. As an article of manufacture, a blank for making a receptacle body of truncated cone form having the opening thereto at the smaller end and adapted to be collapsed to close the receptacle, comprising a died-out sheet having the opposite sides inclined from the base end toward the top end in a direction toward each other and at the same angle with the base end in an arc of a circle whose center lies in a line extending vertically to the base and centrally between the sides of the sheet, and the top extending inward and downward from the sides and merging in an intermediate portion, said intermediate portion being equal in length to one side of the receptacle at the upper end when collapsed.

3. As an article of manufacture, a blank of quadrilateral form for making a receptacle body the opposite sides of which converge from the end constituting the base of the receptacle, the base being arranged in an arc of a circle and the end opposite the base end being a chord of the angle formed and intercepted by the sides and having the opposite end portions inclined from the sides at an obtuse angle to and merging with an intermediate portion, the intermediate portion being of a length to form one segment of the top edge of the body and the inclined portions being of lengths to form the remaining segment of such top edge.

4. As an article of manufacture, a receptacle blank having the one end to constitute the base of the receptacle in an arc of a circle, the opposite sides of the blank converging from said arcuate shaped end, and the end opposite the arcuate shaped end being a chord of the angle formed and intercepted by the sides the vertex of which is at the center from which the curve of the arcuate end is struck, the opposite ends of which chord incline from the sides at an obtuse angle to and merge with an intermediate portion, and the intermediate portion being of a length equal to one side of the receptacle at the upper edge.

5. A blank for forming a tubular truncated receptacle body, comprising a died-out sheet having opposite edges converging at the same angle from one end to the opposite end, with the edge between the diverging ends of the sides to constitute the base of a receptacle formed from the blank of arcuate shape, and the edge between the converging ends of the sides to constitute the top of the receptacle adapted to be collapsed to close the same having three straight line parts arranged at an obtuse angle to each other, and said parts arranged and dimensioned so that the intermediate portion will constitute one side and the end portions the opposite side of the upper edge of the receptacle when it is collapsed and extend in an even plane.

Signed at the city, county and State of New York, this 3rd day of April, 1929.

RODOLPHE R. REILLY.